Figure 1:
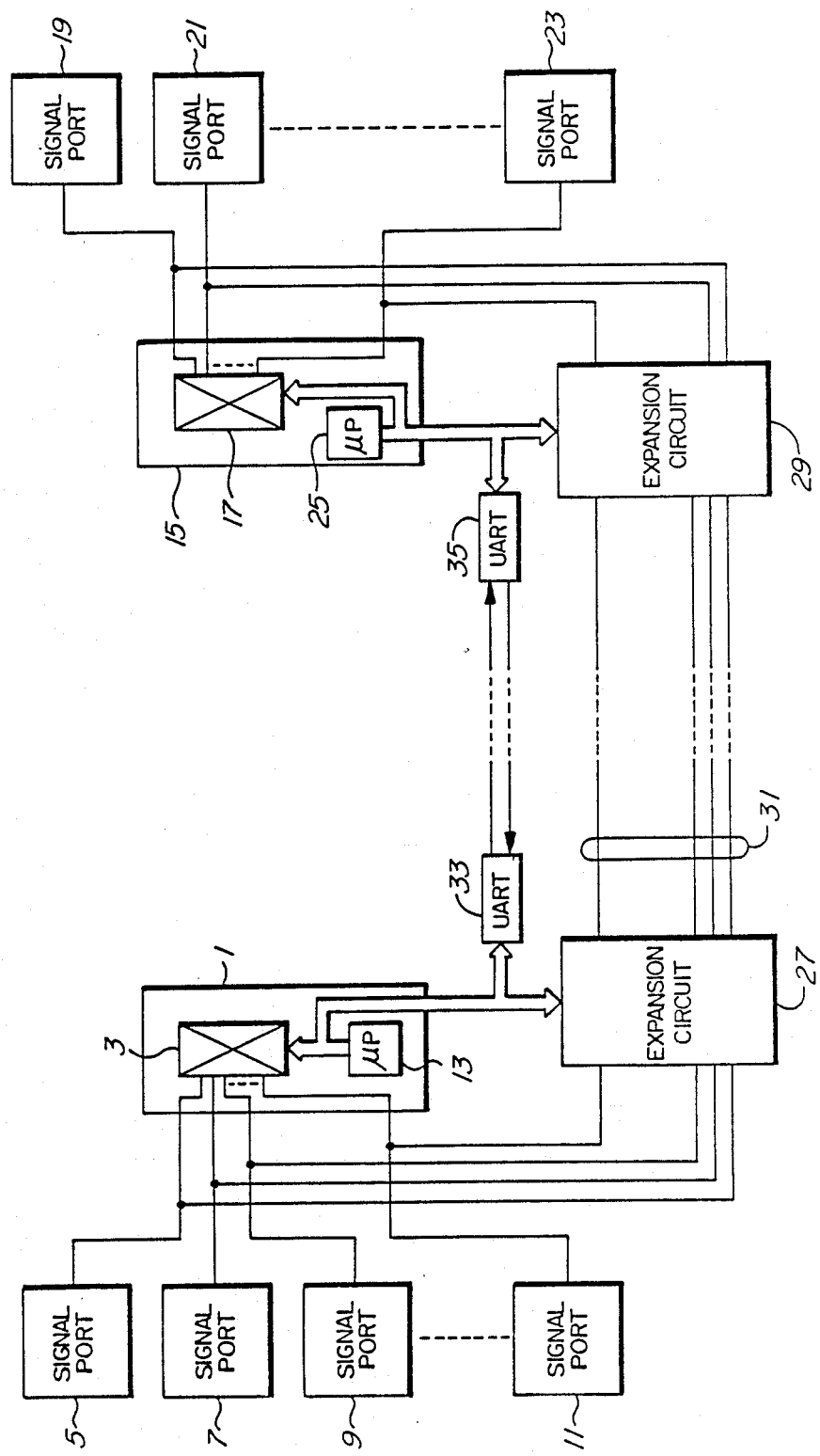

United States Patent [19]

Molnar

[11] Patent Number: 4,726,054
[45] Date of Patent: Feb. 16, 1988

[54] SYSTEM FOR INTERCONNECTING A PAIR OF COMMUNICATION SYSTEMS

[75] Inventor: Gerald Molnar, Ottawa, Canada

[73] Assignee: Trillium Telephone Systems, Inc., Kanata, Canada

[21] Appl. No.: 840,395

[22] Filed: Mar. 17, 1986

[30] Foreign Application Priority Data

Nov. 20, 1985 [CA] Canada .................................. 495811

[51] Int. Cl.⁴ ............................................. H04Q 3/60
[52] U.S. Cl. ..................................... 379/94; 379/230;
379/269; 379/334
[58] Field of Search ............... 379/230, 269, 334, 335,
379/94; 370/58

[56] References Cited

U.S. PATENT DOCUMENTS

| | | | |
|---|---|---|---|
| 3,592,970 | 7/1971 | Cappetti et al. | 379/334 X |
| 3,863,035 | 1/1975 | Lovell | 379/334 X |
| 4,042,785 | 8/1977 | Rigo et al. | 379/334 X |
| 4,197,427 | 4/1980 | Hutcheson et al. | 379/334 X |
| 4,210,782 | 7/1980 | Fujita | 379/269 |
| 4,230,913 | 10/1980 | Brothers et al. | 379/334 X |
| 4,289,934 | 9/1981 | Pitroda et al. | 379/269 |
| 4,302,632 | 11/1981 | Vicari et al. | 379/334 X |
| 4,466,062 | 8/1984 | Krikot | 379/230 X |

OTHER PUBLICATIONS

Battarel et al., "MT35 Switching System: Intersite Communication System", Commutation & Transmission No. 4, 1983.

Primary Examiner—Jin F. Ng
Assistant Examiner—M. E. Connors
Attorney, Agent, or Firm—Laff, Whitesel, Conte & Saret

[57] ABSTRACT

A system for interconnecting a pair of communication systems comprising a pair of expansion switching matrices connected to bidirectional signal ports of the respective communication systems and interconnected via a plurality of signal paths, such as junctors. Control information is transmitted between central controllers of the pair of communication systems via a pair of serial data transmission circuits, such as universal asynchronous receiver/transmitters. Thus, predetermined ones of the signal ports of the separate communication systems may be interconnected via the expansion switching circuits independently of signal traffic within the respective communication systems. In addition, special features such as call ring back busy, may be implemented between signal ports of the respective communication systems as a result of control information being communicated via the serial data transmission circuits. The system according to the present invention is of simple and inexpensive design, and may be advantageously implemented for use in key telephone systems and PABXs.

27 Claims, 2 Drawing Figures

SYSTEM FOR INTERCONNECTING A PAIR OF COMMUNICATION SYSTEMS

This invention relates in general to communication systems, and in particular to a system for interconnecting a pair of communication systems for effecting simultaneous signal communication.

The feature of expandability of modern day communication systems, such as PABXs and key telephone systems, is becoming increasingly more important in light of customer demands that initial expenditure for acquiring a base system be minimized and that any additional upgrading or expansion of the system be on a "pay as you go" basis.

For instance, in the event that it is desired to have access to further signal ports than could be accommodated by an existing base system, the customer may wish to purchase a second identical system for connection to the further signal ports and operation in tandem with the existing system.

In the past, prior art systems were typically interconnected via tie trunks extending between local circuit switch matrices resident on each of the systems. Since all signal switching was conducted via the local circuit switch matrices of the two systems, expansion of the systems was limited by the switching capacity of the local matrices. Also, control information was typically not exchanged between the systems so that special features such as ring back or automatic call busy, etc., were not easily implemented. The prior art systems simply transmitted dial pulse or DTMF signals via the tie trunks to establish predetermined interconnections between the systems, yet no additional control signals were conveyed.

According to the present invention, a system is provided for interconnecting a pair of communication systems via a pair of external expansion switching circuits connected directly to individual ones of the bidirectional signal ports of the respective systems, and interconnected via a plurality of dedicated signal paths. Accordingly, bidirectional signal communication is established between the pair of communication systems independently of signal traffic in the resident circuit switch matrices of the respective systems. The expansion switching circuits are connected to respective central controllers of the communication systems for controlling the configuration of the switching circuits to effect predetermined interconnections in a straightforward manner.

According to a preferred embodiment, a pair of serial data communication circuits, such as universal asynchronous receiver/transmitters are connected to each of the central controllers of the respective communication systems, for facilitating data communication between the central controllers using either a handshaking mode of tandem system control or a master/slave mode of control.

Figure 2:
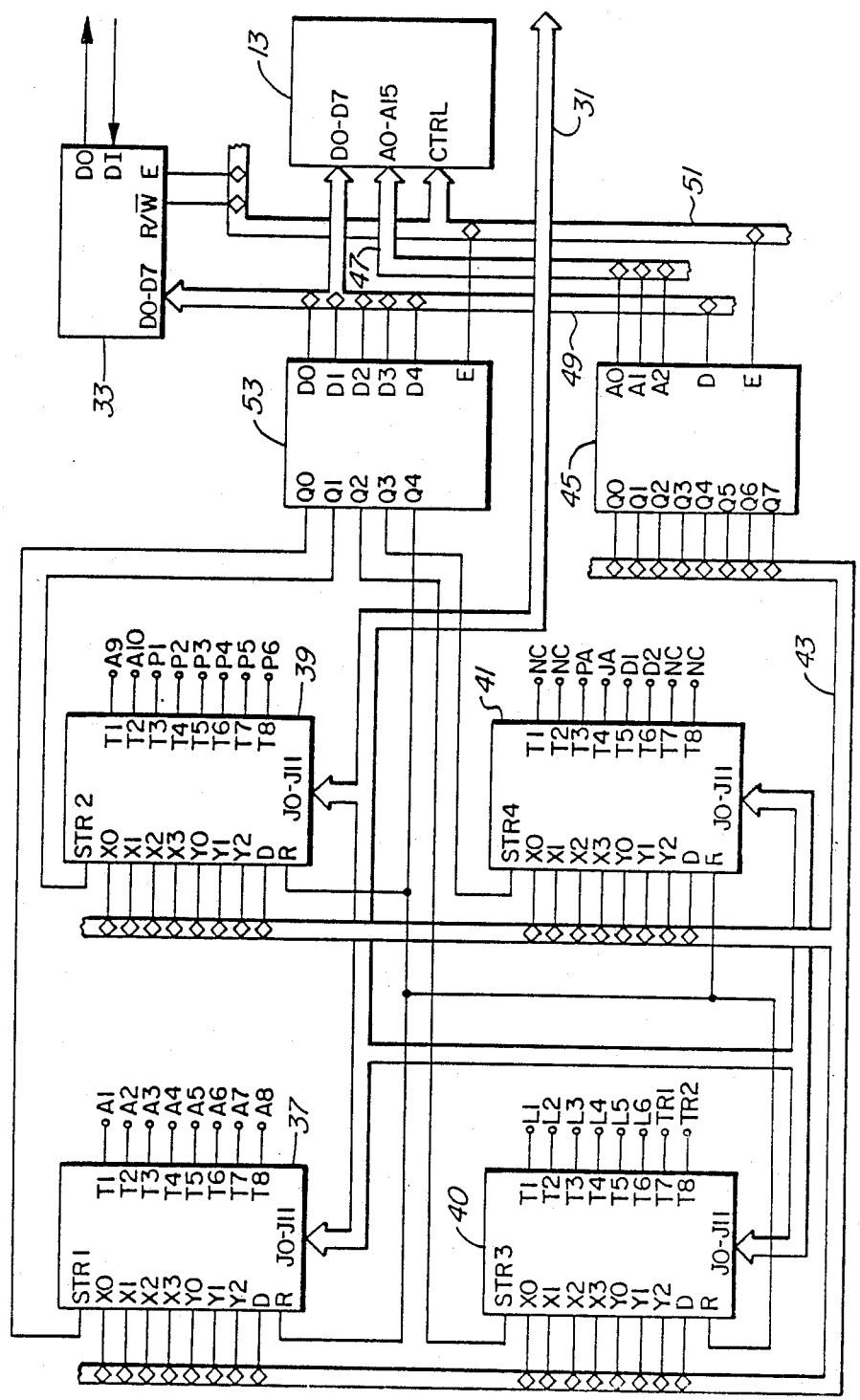

A better understanding of the invention will be obtained with reference to the detailed description below, in conjunction with the following drawings in which:

FIG. 1 is a block schematic diagram of circuitry for interconnecting two communication systems, according to the present invention, and FIG. 2 is a detailed schematic diagram of expansion circuitry according to a preferred embodiment of the present invention.

With reference to FIG. 1, a first communication system is shown denoted by reference numeral 1, is comprised of an internal circuit switch matrix 3 for interconnecting a plurality of bidirectional signal ports 5, 7, 9, . . . 11 under control of a central processor such as a microprocessor 13.

The circuit switch matrix 3 is preferably a crosspoint switching matrix such as the SGS Model MO93 switching matrix.

Bidirectional signal ports 5, 7, 9, . . . 11 can be, for instance subscriber line interface circuits for connection to one or more local subscriber sets in a telephone system, trunk circuits for connection to one or more outside telephone lines, dial tone detectors, paging circuits, tie trunks, modems, etc. All such bidirectional signal ports are well known in the communication arts although the specific construction thereof does not form part of the present invention.

A second communication system is shown having a central controller 15 incorporating a circuit switch matrix 17 for interconnecting a plurality of expansion or peripheral bidirectional signal ports 19, 21, . . . 23 under control of a central controller, such as a microprocessor 25. The communication system 15 is preferably substantially identical to system 1 and is interconnected with communication system 1 in order to accommodate the additional expansion or peripheral signal ports 19, 21, . . . 23, each being comprised of one of the aforementioned well known signal ports such as subscriber line interface circuits, trunk circuits, tie trunks, etc. In addition, the expansion or peripheral ports may be comprised of a digital ISDN interface circuit for connection to an integrated voice and data set, or a MODEM for connection to a personal computer, etc.

In order to facilitate interconnection of the two communication systems 1 and 15, a pair of expansion circuits 27 and 29 are illustrated having input terminals thereof connected to respective ones of the signal ports 5, 7, 9, . . . 11 and 19, 21, . . . 23. The expansion circuits 27 and 29 are interconnected via a plurality of signal paths connected in parallel with the local switching circuitry 3, denoted as 31, which can be, for instance, a plurality of junctors.

According to the preferred embodiment, the expansion circuits 27 and 29 are comprised of crosspoint or space switching circuits for connecting predetermined ones of the signal ports 5, 7, 9, . . . 11 and 19, 21, . . . 23 to predetermined ones of the signal paths 31 under control of the microprocessors 13 and 25.

Accordingly, signal communication is established between the predetermined signal ports connected to the respective communication systems 1 and 15, independently of circuit switch matrices 3 and 17. Thus, in the event of heavy signal traffic carried by one or both of the circuit switching matrices 3 and 17, one or a plurality of communication paths may nonetheless be established between signal ports of the respective systems 1 and 15 via the expansion circuits 27 and 29.

A pair of data communication circuits, such as UARTs 33 and 35 are shown connected to the microprocessors 13 and 25 respectively. Data communication circuits 33 and 35 facilitate the exchange of control information between microprocessors 13 and 25 such that the switching configuration of the expansion circuits 27 and 29 (as well as circuit switch matrices 3 and 17) may be controlled by one of the microprocessors 13 or 25 with the other one of the microprocessors functioning as a slave processor. Alternatively, a handshaking protocol may be established between the microprocessors 13 and 25 for effecting dual control of signal switching. In addition, special features such as automatic call back busy, etc., can be implemented in response to exchange of control information between the microprocessors via UARTs 33 and 35.

For ease of description, expansion circuit 27 (FIG. 1) will be discussed in connection with the preferred embodiment illustrated in FIG. 2. However, it will be understood that expansion circuit 29 (FIG. 1) is of substantially identical design and operates in substantially the same manner as circuit 27.

A plurality of switching matrices 37, 39, 40 and 41 are shown having junctor terminals J0–J11 connected to the plurality of signal paths 31 (FIG. 1), which according to the preferred embodiment are comprised of a plurality of junctors. Control inputs X0-X3, Y0-Y2 and D of each of the matrices are connected to a control bus 43. A latch circuit 45 receives address, data and control signals from microprocessor 13, for controlling the interconnection of various ones of the signal ports connected to the matrices 37, 39, 40 and 41. In particular, address inputs A0–A2 latch 45 are connected to corresponding address lines of an address bus 47 connected to microprocessor 13, a data input D of latch circuit 45 is connected to a predetermined line of a data bus 49 connected to microprocessor 13, and an enable input E is connected to a predetermined line of a control bus of microprocessor 13, shown as 51, which in the preferred embodiment was a decoded address line of address bus 47.

Q0–Q7 outputs of latch 45 are connected via individual lines of control bus 43 to the control inputs of the crosspoint switching matrices 37, 39, 40 and 41.

Control signals appearing on the control inputs of the switching matrices 37, 39, 40 and 41 are clocked or strobed into matrices in response to receiving a control pulse on the STR1, STR2, STR3 and STR4 inputs respectively thereof. Strobe control pulses are transmitted by latch 53 under control of microprocessor 13. In particular, data inputs D0–D4 of latch 53 are connected to corresponding data lines of microprocessor 13 via data bus 49, and the Q0–Q3 outputs of latch 53 are connected to the STR1, STR2, STR3 and STR4 inputs of matrices 37, 39, 40 and 41, respectively. The Q4 output of latch 53 is connected to the reset inputs R of each of the switching matrices 37, 39, 40 and 41 for initializing each of the matrices.

Terminals T1–T8 of each of the switching matrices 37, 39, 40 and 41 are connected to the aforementioned signal ports 5, 7, 9, . . . 11 (FIG. 1). For example, according to a successful prototype of the invention, the T1–T6 terminals of matrix 40 are connected to bidirectional input and output terminals of a plurality of subscriber line interface circuits, denoted as L1–L6. The T7 and T8 terminals are connected to bidirectional input/output terminals of a pair of trunk circuits TR1 and TR2 respectively. The T1–T8 terminals of matrix 37 are connected to expansion ports denoted as A1–A8 for accommodating further line or trunk circuits, or additional varieties of signal ports. The T1 and T2 inputs of matrix 39 are connected to a further pair of expansion ports denoted A9 and A10. The T3–T7 terminals of matrix 39 are connected to peripheral ports P1–P6 for connection to computer circuitry such as modems, etc.

The T1 and T2 terminals of matrix 41 are left unconnected. The T3 terminal of matrix 41 is connected to a paging circuit denoted as PA, the T4 terminal is connected to a junctor access circuit denoted as JA, and the T5 and T6 terminals are connected to dial tone detection circuits D1 and D2 respectively.

As discussed above, the design and operation of the signal ports connected to the T1-T8 terminals of respective ones of the switching matrices do not form part of the present invention but would be well known to a person skilled in the art.

According to a successful prototype of the invention, switching matrices 37, 39, 40 and 41 are each eight-by-twelve line space or crosspoint switching matrices such as the SGS Model MO93 switching matrix. In order to connect one of the terminals J0–J11 to one of the terminals T1-T8, addressing information is tranmitted to the X0-X3, Y0-Y2 and D inputs of the matrices 37, 39, 40 and 41 generated by microprocessor 13 and transmitted via the Q0–Q7 outputs of latch 45 and strobed or clocked into respective ones of the switching matrices in response to control signals generated by microprocessor 13 and transmitted via latch 53.

Tables 1 and 2 are truth tables for illustrating the interconnection of the various terminals of crosspoint switching matrices 37, 39, 40 and 41 in response to various address signals being applied to the address inputs thereof according to the successful prototype.

TABLE 1

| Connection | X2 | X1 | X0 |
|---|---|---|---|
| T1 | 0 | 0 | 0 |
| T2 | 0 | 0 | 1 |
| T3 | 0 | 1 | 0 |
| T4 | 0 | 1 | 1 |
| T5 | 1 | 0 | 0 |
| T6 | 1 | 0 | 1 |
| T7 | 1 | 1 | 0 |
| T8 | 1 | 1 | 1 |

TABLE 2

| Connection | X3 | X2 | X1 | X0 |
|---|---|---|---|---|
| J0 | 0 | 0 | 0 | 0 |
| J1 | 0 | 0 | 0 | 1 |
| J2 | 0 | 0 | 1 | 0 |
| J3 | 0 | 0 | 1 | 1 |
| J4 | 0 | 1 | 0 | 0 |
| J5 | 0 | 1 | 0 | 1 |
| J6 | 1 | 0 | 0 | 0 |
| J7 | 1 | 0 | 0 | 1 |
| J8 | 1 | 0 | 1 | 0 |
| J9 | 1 | 0 | 1 | 1 |
| J10 | 1 | 1 | 0 | 0 |
| J11 | 1 | 1 | 0 | 1 |

The D0–D7 data terminals of UART 33 are shown connected to data bus 49 for receiving and transmitting data signals to and from microprocessor 13 and via unidirectional data input and output terminals DI and DO to the other remote UART 35 (FIG. 1). A control terminal (R/$\overline{W}$) and an enable terminal E of UART 33 are connected to control bus 51 for controlling operation thereof via microprocessor 13, in a well known manner.

In operation, predetermined signal ports connected to the T1-T8 terminals of matrices 37, 39, 40 and 41 are interconnected with corresponding signal ports connected to identical switching matrices in the expansion circuit 29, independently of the circuit switch matrices 3 and 7 (FIG. 1). Data signals are transmitted and received via UARTs 33 and 35 in order to effect tandem or dual switching of the separate communication systems 1 and 15.

Alternatively, predetermined ones of the signal ports on a predetermined one of the communication system 1 or 15 can be interconnected via the corresponding expansion switching circuit 27 or 29 for improving the signal traffic handling capability of the predetermined communication system. In this way, the circuit according to the present invention may be utilized for establishing a non-blocking communication system.

A person skilled in the art understanding the present invention may conceive of other embodiments or variations thereof without departing from the sphere and scope of the present invention as defined by the claims appended hereto.

I claim:

1. A system for interconnecting a pair of communication systems, each communication system having a central controller and local switching circuitry for interconnecting a plurality of signal ports connected thereto under control of the respective central controller, comprised of a pair of expansion circuits connected together via a multiple line signal bus and to the central controller and signal ports of respective ones of said communication systems in parallel with said local switching circuitry, for interconnecting said plurality of signal ports of said respective communication systems via said multiple line signal bus under control of the respective central controllers, whereby signal communication is established between said pair of communication systems independently of the local switching circuitry of said pair of communication systems.

2. A system as defined in claim 1, further including a pair of data communication circuits connected together and to respective ones of the central controllers of said pair of communication systems, for establishing data communication between said respective central controllers, thereby facilitating simultaneous control of said pair of expansion circuits by said respective central controllers.

3. A system as defined in claim 2, wherein each of said pair of expansion circuits is comprised of one or more space switching matrices having control inputs connected via a plurality of latch circuits to the respective central controller.

4. A system as defined in claim 1, wherein one or more of said signal ports are comprised of subscriber line interface circuits for bidirectionally translating signals between said local switching circuitry and one or more local subscriber sets.

5. A system as defined in claim 1, wherein one or more of said signal ports are comprised of trunk circuits for bidirectionally translating signals between said local switching circuitry and one or more outside telephone lines.

6. A system as defined in claim 1, wherein one or more of said signal ports are comprised of dial tone detectors for connection to one or more additional ones of said signal ports via said local switching circuitry and detecting dial tone signals carried thereon.

7. A system as defined in claim 1, wherein at least one of said signal ports is comprised of a paging circuit for applying page signals to one or more additional ones of said signal ports via said local switching circuitry.

8. A system as defined in claim 1, wherein each of said pair of expansion circuits is comprised of an eight by twelve line crosspoint switching matrix, and said multiple line signal bus is comprised of twelve bidirectional junctor lines.

9. A system as defined in claim 2, wherein said data communication circuits are comprised of universal asynchronous receiver/transmitter circuits for establishing serial full duplex data communication between said pair of central controllers.

10. A system as defined in claim 1, wherein one or more of said signal ports is comprised of a digital interface circuit for bidirectionally translating digital signals between said local switching circuitry and one or more data sets.

11. A system as defined in claim 10, wherein said digital interface circuit is a digital ISDN interface circuit for bidirectionally translating digital voice and data signals between said local switching circuitry and one or more integrated voice and data subscriber sets.

12. A system as defined in claim 1, wherein one or more of said signal ports is comprised of a MODEM for bidirectionally translating digital data signals between said local switching circuitry and one or more computers.

13. A system as defined in claim 2, wherein one or more of said signal ports are comprised of subscriber line interface circuits for bidirectionally translating signals between said local switching circuitry and one or more local subscriber sets.

14. A system as defined in claim 3, wherein one or more of said signal ports are comprised of subscriber line interface circuits for bidirectionally translating signals between said local switching circuitry and one or more local subscriber sets.

15. A system as defined in claim 2, wherein one or more of said signal ports are comprised of trunk circuits for bidirectionally translating signals between said local switching circuitry and one or more outside telephone lines.

16. A system as defined in claim 3, wherein one or more of said signal ports are comprised of trunk circuits for bidirectionally translating signals between said local switching circuitry and one or more outside telephone lines.

17. A system as defined in claim 2, wherein one or more of said signal ports are comprised of dial tone detectors for connection to one or more additional ones of said signal ports via said local switching circuitry and detecting dial tone signals carried thereon.

18. A system as defined in claim 3, wherein one or more of said signal ports are comprised of dial tone detectors for connection to one or more additional ones of said signal ports via said local switching circuitry and detecting dial tone signals carried thereon.

19. A system as defined in claim 2, wherein at least one of said signal ports is comprised of a paging circuit for applying page signals to one or more additional ones of said signal ports via said local switching circuitry.

20. A system as defined in claim 3, wherein at least one of said signal ports is comprised of a paging circuit for applying page signals to one or more additional ones of said signal ports via said local switching circuitry.

21. A system as defined in claim 2, wherein each of said pair of expansion circuits is comprised of an eight by twelve line crosspoint switching matrix, and said multiple line signal bus is comprised of twelve bidirectional junctor lines.

22. A system as defined in claim 3, wherein each of said pair of expansion circuits is comprised of an eight by twelve line crosspoint switching matrix, and said multiple line signal bus is comprised of twelve bidirectional junctor lines.

23. A system as defined in claim 3, wherein said data communication circuits are comprised of universal asynchronous receiver/transmitter circuits for establishing serial full duplex data communication between said pair of central controllers.

24. A system as defined in claim 2, wherein one or more of said signal ports is comprised of a digital interface circuit for bidirectionally translating digital signals between said local switching circuitry and one or more data sets.

25. A system as defined in claim 3, wherein one or more of said signal ports is comprised of a digital interface circuit for bidirectionally translating digital signals between said local switching circuitry and one or more data sets.

26. A system as defined in claim 2, wherein one or more of said signal ports is comprised of a MODEM for bidirectionally translating digital data signals between said local switching circuitry and one or more computers.

27. A system as defined in claim 3, wherein one or more of said signal ports is comprised of a MODEM for bidirectionally translating digital data signals between said local switching circuitry and one or more computers.

* * * * *